United States Patent [19]

Maurice

[11] Patent Number: 5,095,306
[45] Date of Patent: Mar. 10, 1992

[54] DISPLAY SCREEN ALLOWING FOR THE VISUAL DISPLAY OF THE CONTOUR OF AN IMAGE AND METHOD TO CONTROL SUCH A SCREEN

[75] Inventor: Francois Maurice, Verrieres-le-Buisson, France

[73] Assignee: L'Etat Fracais represente par le Ministere des Postes, des Telecommunications et de l'Espace (Centre National d'Etudes des Telecommunications), Issy les Moulineaux, France

[21] Appl. No.: 359,328

[22] Filed: May 31, 1989

[30] Foreign Application Priority Data

Jun. 1, 1988 [FR] France ................ 88 07287

[51] Int. Cl.⁵ .................. G09G 3/00; G02F 1/1343
[52] U.S. Cl. ................... 340/784; 340/805; 359/55; 359/87
[58] Field of Search ............. 340/759, 765, 784, 805; 350/333, 339 R, 350 S, 332

[56] References Cited

U.S. PATENT DOCUMENTS

| | | | |
|---|---|---|---|
| 4,589,733 | 5/1986 | Yaniv et al. | 350/332 |
| 4,626,841 | 12/1986 | Togashi | 340/805 |
| 4,639,087 | 1/1987 | Cannella | 350/339 R |
| 4,712,872 | 12/1987 | Kanbe et al. | 350/333 |
| 4,776,676 | 10/1988 | Inoue et al. | 340/765 |
| 4,782,337 | 11/1988 | Clerc et al. | 340/784 |

FOREIGN PATENT DOCUMENTS 2134684 8/1984 United Kingdom.

OTHER PUBLICATIONS

Japanese Patent Abstract, vol. 10, No. 149 (P—461), 2206, 30.5.1986 & JP—A—61 311.9 (Canon K.K.).

Primary Examiner—Ulysses Weldon
Assistant Examiner—Steven J. Saras
Attorney, Agent, or Firm—Oblon, Spivak, McClelland, Maier & Neustadt

[57] ABSTRACT

A display screen allowing for the visual display of the contour of an image and a method for controlling such a screen. According to the present invention, the counterelectrode is etched on elementary motifs electrically insulated from each other. Each motif covers part of the addressed electrodes. The display of the image is effected normally, but with the possibility of having its contour appear without using additional means. Such a device finds particular application for display screens.

4 Claims, 3 Drawing Sheets

DISPLAY SCREEN ALLOWING FOR THE VISUAL DISPLAY OF THE CONTOUR OF AN IMAGE AND METHOD TO CONTROL SUCH A SCREEN

BACKGROUND OF THE INVENTION

1. Field of the Invention

The present invention concerns a display screen allowing for the visual dislay of the contour of a screen and a method for controlling such a screen.

2. Discussion of the Background

This invention can generally be applied to optical image formation uses in various spheres (scientific, professional or medical) and in the metrology of the image.

A display screen according to the prior Art is described in FIG. 1. The one represented includes:
- a first substrate 10 covered with a matrix of control electrodes Eij defining so many pixels and covered with addressing lines Li and addressing columns Cj suitable for addressing a suitable voltage onto each electrode Eij,
- a second substrate 20 covered with a counterelectrode CE,
- between the two substrates 10 and 20, an electrooptical material 30, such as a liquid crystal film.

A transistor Tij is placed at each crossing of an addressing line Li and an addressing column cj.

The application of certain voltages to the lines and columns allows for the displaying of an image point by point or line by line.

In certain professional fields, it is often necessary to extract from a bidimensional image the characteristics of certain represented objects. It is then practical to make the contours of these images appear.

Up until now, this has required the use of a specialized computer for contour extraction, but these calculation means add to the price of the equipment.

SUMMARY OF THE INVENTION

The object of the invention is to offer the present possibility of visually displaying the contours of an image, either solely the contours or by superimposing them with the image itself, without the use of any additional calculation device.

By using the screen of the present invention instead of using a conventional visual display system, it is possible to directly visually display an image, its contours or a variable proportional mixture of the two.

According to the invention, this objective can be attained by using a screen characterized by the fact that the counter-electrode of the second substrate is etched on at least one section of its surface on elementary motifs electrically insulated from each other (floating potential), each motif covering part of the adjacent electrodes of the first substrate.

In order to control such a screen, appropriate voltages are applied to the addressing lines and columns so as to have appear on each electrode:
- for a first frame parity (e.g. even), either a voltage of a first type, e.g. of the form Vid $(1+k)+C$, or a voltage of a second type, e.g. of the form Vid $(1-k)-C$,
- for a second frame parity (e.g. odd), either a voltage of the second type, e.g. of the form Vid $(1-k)-C$, or a voltage of the first type of the form Vid $(1+k)+C$ where Vid is a voltage defined by the display to be obtained, k a numerical coefficient and C a given constant voltage, the application of these voltages being such that each motif of the counter-electrode presents on each frame as much surface opposite the electrodes excited by a voltage of the first type as the surface opposite the electrodes excited by a voltage of the second type.

In other words, for a first given frame parity, some electrodes are at the first type of voltage and the others are at the second type of voltage and for the second frame parity those electrodes which were at the first type of voltage are brought to the second type of voltage and those electrodes which were at the second type of voltage are brought to the first type of voltage.

As shall be understood more readily from the following, this etching of the counter-electrode and this control method makes it possible to reinforce the contours of an image without hindering the normal display mode.

BRIEF DESCRIPTION OF THE DRAWINGS

The characteristics and advantages of the invention shall appear more readily from a reading of the following description relating to examples of embodiments given by way of illustration in no way restrictive and with reference to the accompanying drawings in which.

DETAILED DESCRIPTION OF THE PREFERRED EMBODIMENTS

Figure 1:
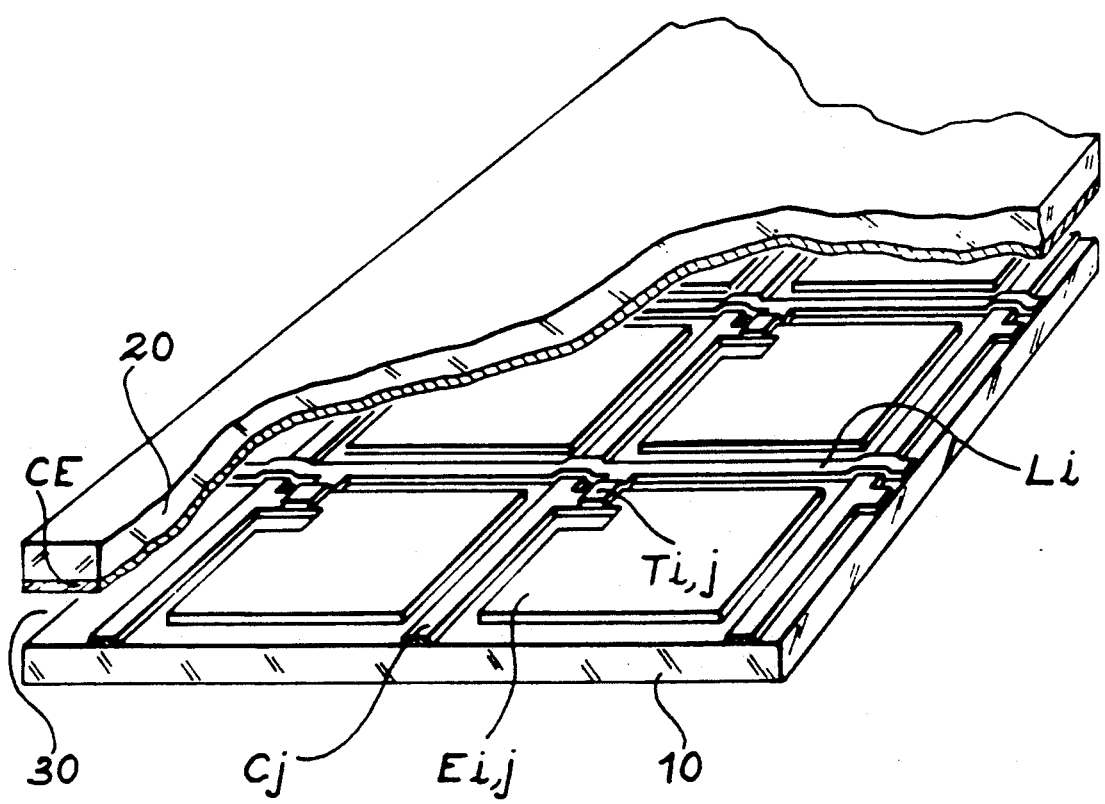
FIG. 1, already described, represents a display screen with liquid crystals according to the prior Art.
Figure 2:
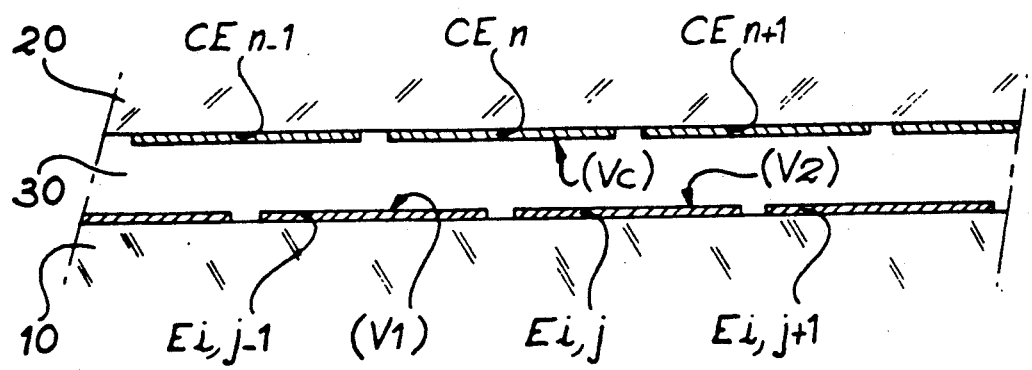
FIG. 2 shows a sectional view of a screen according to the invention.

FIG. 2 shows a sectional view of a display screen with its two substrates 10 and 20. On the first substrate, there are the electrodes Ei, j−1; Ei,j; Ei,j+1 (the section is supposed to be made parallel to an addressing line Li through the electrodes); on the substrate 20, the counter-electrode is etched on motifs $CE_{n-1}$, $CE_n$, $CE_{n+1}$, etc. These motifs are electrically insulated from each other and partly cover the electrodes of the substrate 10. Thus, the motif CEn covers the right half of the electrode Ei,j−1 and the left half of the electrode Ei,j.

In order to describe the functioning principle of the screen of the present invention, it can initially be supposed that this concerns a fictive screen which would be linear with only one line of electrodes and etched conductive motifs disposed opposite thereto.

The voltages applied to the two adjacent electrodes Ei,j−1 and Ei,j are noted V1 and V2. The voltage appearing on the motif CEn of the counter-electrode is noted VC.

There is a distinction as regards three types of display, namely that of the display of a conventional image, that of the display of the contours of an image and that of the display of an image with reinforcement of contours:

a) display of a conventional image

It is desired to display a grey corresponding to the voltage level Vid. The following are then applied to the electrodes:

i) during the even frames:

$$V1 = Vid + C$$

$$V2 = -Vid - C$$

C is a constant voltage linked to the possible threshold of the liquid crystal.

As Vc is floating, it takes the value:

$$Vc = \frac{V1 + V2}{2} = 0$$

ii) during the odd frames:

$$V1 = -Vid - C$$

$$V2 = Vid + C$$

where Vc=0.

The liquid crystal is then excited when near to the motif CEn by a square pulse with an actual value of C+Vid.

The result is then a normal contrast display of the image, although the counter-electrode is brought to a floating potential.

b) Display of the contours of the image:
In this case, the following are applied:
i) even frames:

$$V1 = Vid1 + C$$

$$V2 = Vid2 - C$$

$$Vc = \frac{V1 + V2}{2} = \frac{Vid1 + Vid2}{2}$$

in which $$V1 - Vc = \frac{Vid1 - Vid2}{2} + C = v + C$$

with $$v = \frac{Vid1 - Vid2}{2}$$

ii) odd frames:

$$V1 = Vid1 - C$$

$$V2 = Vid2 + C$$

$$Vc = \frac{V1 + V2}{2} = \frac{Vid1 + Vid2}{2}$$

$$V1 - Vc = \frac{Vid1 - Vid2}{2} - C = v - C$$

One then has:

$$(V1 - Vc)RMS = C\sqrt{1 + \frac{v^2}{C^2}} \quad (1)$$

It is established by analysing the formula (1) that if Vid1=Vid2 (which corresponds to a uniform range), then (V1−VC) RMS=C i then a luminance level is displayed which is independent of the video signal.

On the other hand, if this occurs on a contour, then v≠0 and the excitation level of the liquid crystal is higher.

Thus, one has obtained the desired result: display of the contour on a uniform background.

Formula (1) shows that here this involves an effect of the second order at v, which procures certain immunity to noise.

c) Display of an image with reinforcement of contours:

This functioning mode is a combination of the previous two modes.

In this case, the following are formed:
i) even frames:

$$V1 = Vid1(1 + k) + C; V2 = Vid2(1 - k) - C;$$

$$Vc = Vid + kv$$

with $v = \frac{Vid1 - Vid2}{2}$ and $Vid = \frac{Vid1 + Vid2}{2}$;

in which V1−Vc=v+kVid+C
ii) odd frames:

$$V1 = Vid1(1-k) - C;$$

$$V2 = Vid2(1+k) + C;$$

$$Vc = Vid - kv$$

in which V1−Vc=v−k Vid−C
One can deduce from this:

$$(V1 - Vc)RMS = (C + k\,Vid)\sqrt{1 + \frac{v^2}{(C + k\,Vid)^2}}$$

The product of two terms is found:
one (C=k Vid) which corresponds to the appearance of the normal contrast image,
the other $$\sqrt{1 + \frac{v^2}{(C + k\,Vid)^2}}$$

which corresponds to the excess intensity on a boundary line.

Thus, the device may very simply produce a mixture of the image and an intensification of the contours of the image. The terms of the mixture are controlled by analog gain controls in the video amplication section.

The parameters C, Vid and k make it possible to separately control average luminosity, that of the contours and that of the image.

Figure 3:
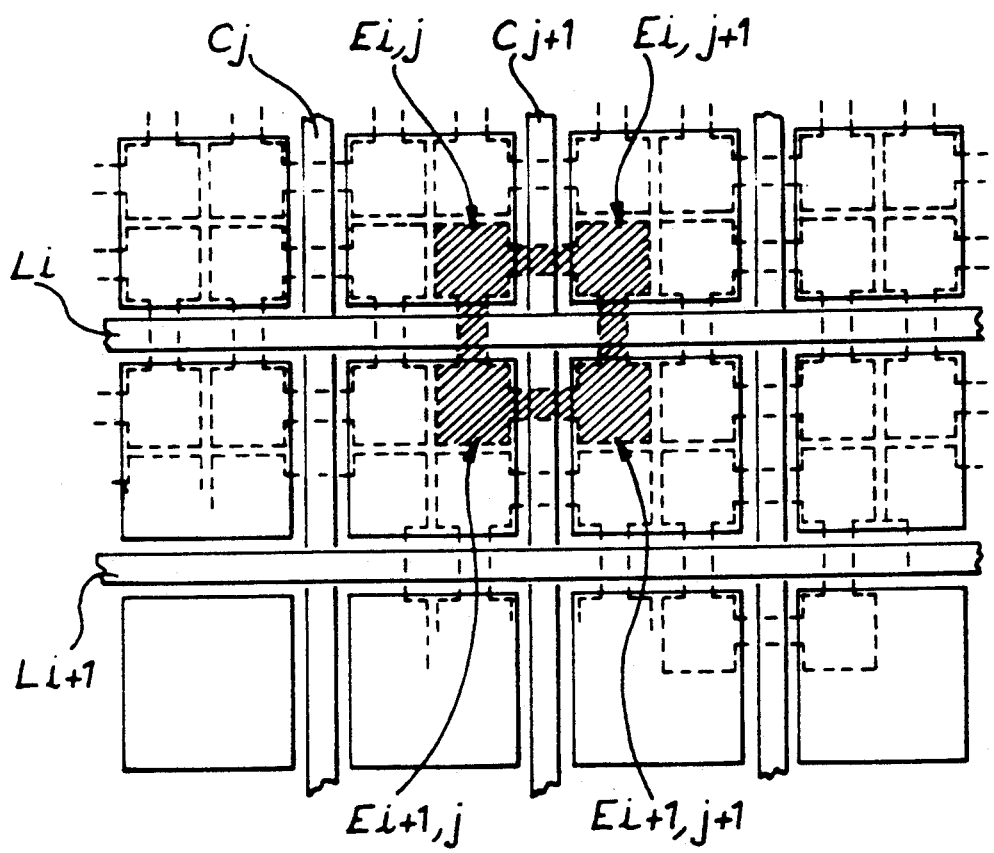
FIG. 3 illustrates a first embodiment of the etching of the counter-electrode.
Figure 4:
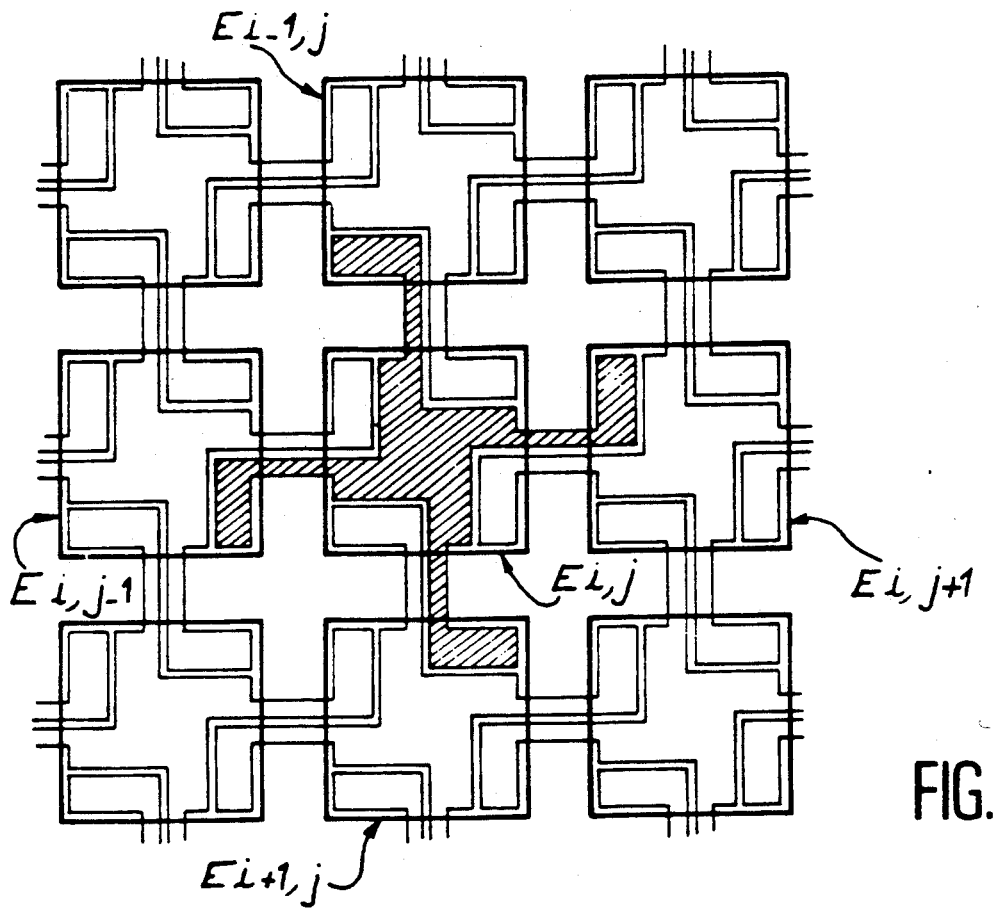
FIG. 4 illustrates a second embodiment of the etching of the counter-electrode.
Figure 5:
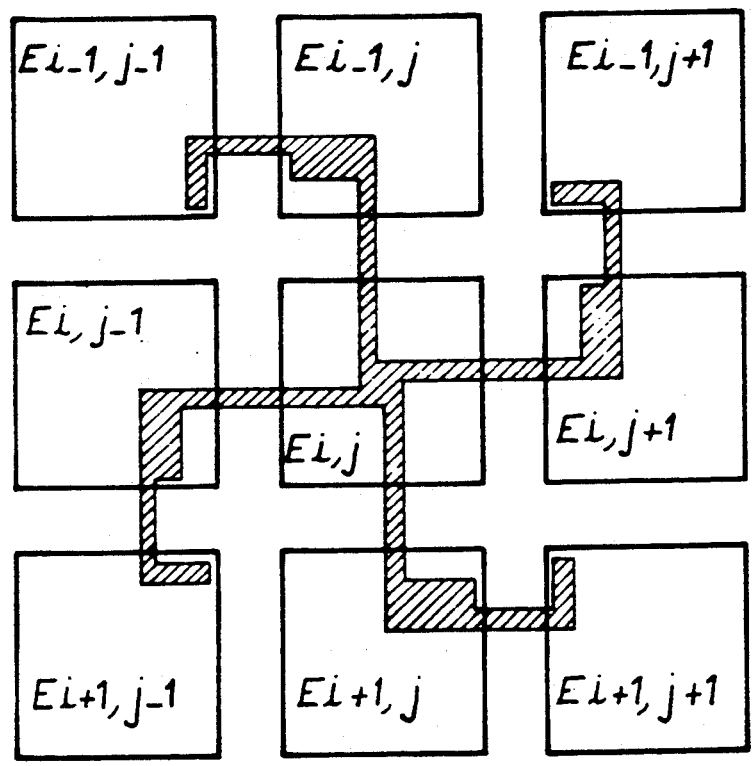
FIG. 5 illustrates a third embodiment of the etching of the counter-electrode.

FIGS. 3, 4 and 5 illustrate a number of particular embodiments of a screen according to the present invention.

FIG. 3 shows a hatched motif of a counterelectrode. This motif is disposed opposite the addressing line Li and the column Cj. It covers one quarter of the pixels Pij; Pi+1,j; Pi,j+1 and Pi+1,j+1.

The etching ensures that parasitic overlapping with the lines and columns is minimized.

The electric functioning of this screen is as follows.

By analogy with the unidimensional case (FIG. 2), two types of voltages are formed:

Vid(1+k)+C(type 1)

Vid(1−k)−c(type 2)

Each of the voltages --Vij; Vi,j+1; Vi+1,j; Vi+1,j+1;--. applied to the pixels shall be of type 1 or type 2 with, however:
 two of these being of type 1, the two others being of type 2,
 change of type with each frame.

The virtual value of voltage acting on the liquid crystal shall then be:

$$VRMS = (C + k\ Vid)\sqrt{1} = \frac{v2}{(C + k\ Vid)2}$$

with:

$$Vid = \frac{Vi,j + Vi,j+1,j + Vi,j+1 + Vi+1,j+1}{4}$$

and v=Vij−Vid.

The device functions as in the unidimensional case previously described, with display at will of the image and/or its contours.

FIGS. 4 and 5 show that it is possible to etch the counter-electrode according to diagrams other than the basic one of FIG. 3. The rule to be observed for the drawing is to have at each moment as much surface opposite the electrodes excited by type 1 voltages as the surface opposite the electrodes excited by type 2 voltages.

This rule is satisfied for the drawings of FIGS. 4 and 5, provided the type of excitation is changed on each line and on each column.

FIG. 4 shows each motif of the counter-electrode covering the central half of an electrode Pij and one eighth at the corner of each of the four adjacent electrodes (Ei,j−1; Ei,j+1; Ei−1,j; Ei+1,j)

FIG. 5 shows each motif covering the central quarter of an electrode Pij, one eighth of the four adjacent electrodes (Ei,j−1; Ei,j+1; Ei−1,j; Ei+1,j) and one sixteenth at the corner of the four electrodes close to the second one.

The etching diagrams of FIGS. 3 to 5 may only concern one part of the counter-electrode, the remaining non-etched part being able to be used to allow for high-resolution text display.

It is possible to make the most of the counter-electrode etching operation by laying between the conductive zones an opaque insulating material which will help to increase screen contrast.

What is claimed is:
1. A display apparatus comprising:
 i) a display screen comprising:
  a first substrate covered with a matrix of control electrodes Eij defining so many pixels, said substrate being covered with addressing lines Li and addressing columns Cj suitable for supplying an appropriate voltage to each control electrode, wherein i and j are integers, a control electrode Eij being controlled by line Li and by column Cj, two control electrodes being adjacent when at least one of their addressing lines and addressing columns are adjacent;
  a second substrate covered with a counter-electrode opposite the control electrodes, said counter-electrode being etched onto at least one part of its surface in elementary motifs which are electrically insulated from each other and at a floating potential, each motif partly covering adjacent control electrodes;
  an electro-optical material between the first and second substrates;
 ii) control means comprising means for applying to said addressing lines Li and said addressing columns Cj voltages suitable for making appear on each control electrode Eij:
  a) for displaying a conventional image:
   for a first frame parity, a voltage of a first type of the form V1=Vid+C on a control electrode and a voltage of a second type of the form V2=−Vid−C on an adjacent control electrode,
   for a second frame parity a voltage of said second type of the form V1=−Vid−C on said control electrode and a voltage of said first type of the form V2=Vid+C on said adjacent control electrode,
  b) for displaying contours of an image:
   for a first frame parity, a voltage of a first type of the form V1=Vid1+C on a control electrode and a voltage of a second type of the form V2=Vid2−C on an adjacent control electrode,
   for a second frame parity a voltage of said second type of the form V1=Vid1−C on said control electrode and a voltage of said first type of the form V2=Vid2+C on said adjacent control electrode,
  c) for displaying an image with reinforcement of contours of said image:
   for a first frame parity a voltage of a first type of the form V1=Vid1(1+k)+C on a control electrode and a voltage of a second type of the form V2=Vid2(1−k)−C on an adjacent control electrode,
   for a second frame parity a voltage of said second type of the form V1=Vid1(1−k)+C on said control electrode and a voltage of said first type of the form V2=Vid2(1+k)+C on said adjacent control electrode,
 where Vid, Vid1 and Vid2 are voltages defined by the display to be obtained, k is a numerical coefficient and C is a given constant voltage, the application of these voltages and the form of each motif of the counter-electrode being such that each motif presents, for each frame, as much surface opposite the control electrodes excited by the first type of voltage as surface opposite the control electrodes excited by the second type of voltage.

2. A display apparatus according to claim 1, wherein each motif of the counter-electrode covers one quarter at a corner of four adjacent control electrodes.

3. A display apparatus according to claim 1, wherein each motif of the counter-electrode covers a central half of one control and one eighth at a corner of each of four control electrodes which encompass said one control electrode.

4. A display apparatus according to claim 1, wherein each motif of the counter-electrode covers one central quarter of one control electrode, one eighth of four adjacent control electrodes and one sixteeth at a corner of four control electrodes close to the adjacent control electrodes.

* * * * *

UNITED STATES PATENT AND TRADEMARK OFFICE
CERTIFICATE OF CORRECTION

PATENT NO. : 5,095,306
DATED     : March 10, 1992
INVENTOR(S) : Francois Maurice It is certified that error appears in the above-identified patent and that said Letters Patent is hereby corrected as shown below:

ON THE TITLE PAGE

The assignee is incorrect, should be, --ETAT FRANCAIS represente par le Ministere des Postes, des Telecommunications et de l'Espace (Centre National d'Etudes des Telecommunications), Issy les Moulineaux, France--.

Signed and Sealed this

Twenty-first Day of September, 1993

Attest:

BRUCE LEHMAN

Attesting Officer           Commissioner of Patents and Trademarks